US008952651B2

(12) United States Patent
Herges et al.

(10) Patent No.: US 8,952,651 B2
(45) Date of Patent: Feb. 10, 2015

(54) ELECTRICALLY DRIVABLE MOTOR VEHICLE WITH TWO ANTI-PARALLEL POWER BRANCHES

(75) Inventors: Peter Herges, Stuttgart (DE); Michael Hofmann, Neubiberg (DE); Joerg Huber, Durmersheim (DE); Dennis Weigel, Fellbach (DE); Axel Willikens, Waiblingen (DE)

(73) Assignee: Daimler AG, Stuttgart (DE)

( * ) Notice: Subject to any disclaimer, the term of this patent is extended or adjusted under 35 U.S.C. 154(b) by 609 days.

(21) Appl. No.: 13/318,052

(22) PCT Filed: Apr. 29, 2010

(86) PCT No.: PCT/EP2010/002625
§ 371 (c)(1),
(2), (4) Date: Nov. 21, 2011

(87) PCT Pub. No.: WO2010/124861
PCT Pub. Date: Nov. 4, 2010

(65) Prior Publication Data
US 2012/0056477 A1    Mar. 8, 2012

(30) Foreign Application Priority Data
Apr. 30, 2009   (DE) .......................... 10 2009 019 531

(51) Int. Cl.
*H02J 7/14* (2006.01)
*B60L 11/18* (2006.01)

(52) U.S. Cl.
CPC .......... *B60L 11/1853* (2013.01); *Y02T 10/7005* (2013.01); *Y02T 10/705* (2013.01); *Y02T 10/7055* (2013.01)
USPC .......................................................... 320/104

(58) Field of Classification Search
USPC .......................................................... 320/104
See application file for complete search history.

(56) References Cited

U.S. PATENT DOCUMENTS

| 4,931,947 | A  | * | 6/1990  | Werth et al. ................... 700/297 |
| 5,194,799 | A  | * | 3/1993  | Tomantschger .............. 320/103 |
| 5,373,195 | A  |   | 12/1994 | De Doncker et al. |
| 7,663,343 | B2 | * | 2/2010  | Soma et al. .................... 320/134 |
| 2004/0112320 | A1 | | 6/2004  | Bolz et al. |

(Continued)

FOREIGN PATENT DOCUMENTS

FR    2 691 022 A1    11/1993
JP    6-276609 A      9/1994

(Continued)

OTHER PUBLICATIONS

International Search Report with partial English translation dated Aug. 24, 2011 (five (5) pages).

(Continued)

*Primary Examiner* — Arun Williams
(74) *Attorney, Agent, or Firm* — Crowell & Moring LLP

(57) ABSTRACT

An electrically drivable motor vehicle with at least two parallel connectable vehicle batteries is provided with an electronic circuit arrangement. The electronic circuit arrangement includes a number of electronic load interrupter switches corresponding to the number of vehicle batteries, via which the vehicle batteries can be connected through individually or together to an electrical consumer. The load interrupter switches respectively comprise two power branches arranged anti-parallel to each other.

9 Claims, 2 Drawing Sheets

(56) References Cited

U.S. PATENT DOCUMENTS

Figure 1:
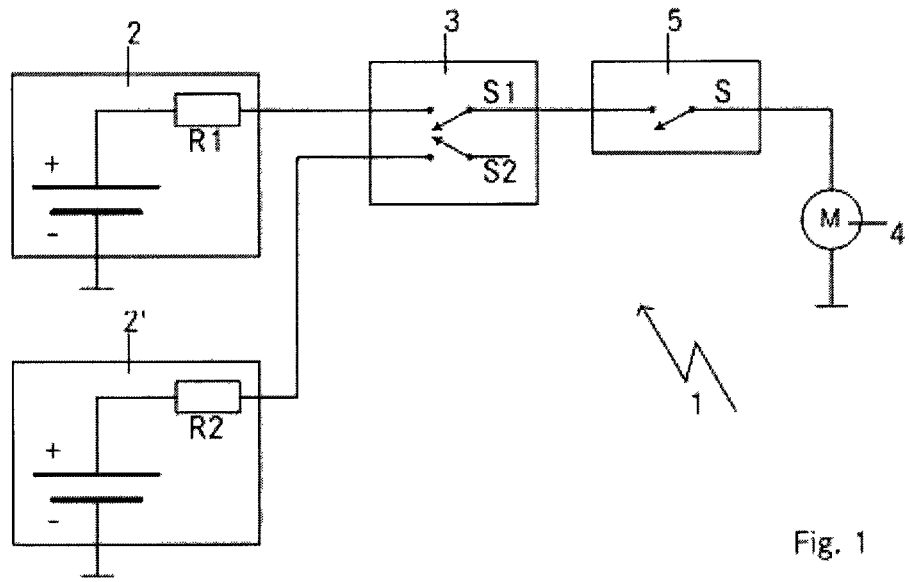

| | | |
|---|---|---|
| 2008/0238527 A1 | 10/2008 | Bolz et al. |
| 2009/0309422 A1* | 12/2009 | Helmick .................. 307/53 |
| 2010/0019723 A1* | 1/2010 | Ichikawa .................. 320/109 |

FOREIGN PATENT DOCUMENTS

| | | |
|---|---|---|
| JP | 2000-278806 A | 10/2000 |
| JP | 2006-60912 A | 3/2006 |
| JP | 2007-43795 A | 2/2007 |
| JP | 2007-507995 A | 3/2007 |
| WO | WO 02/066293 A1 | 8/2002 |
| WO | WO 2005/035317 A1 | 4/2005 |

OTHER PUBLICATIONS

Form PCT/ISA/237 (six (6) pages).
Japanese-language Office Action dated Mar. 6, 2013 (three (3) pages).
Japanese Office Action with partial English translation dated Aug. 6, 2013 (four (4) pages).
Chinese Office Action dated Jul. 25, 2013 with partial English translation (Nine (9) pages).
English Translation of Chinese Office Action dated Mar. 7, 2014 (three (3) pages).

* cited by examiner

ELECTRICALLY DRIVABLE MOTOR VEHICLE WITH TWO ANTI-PARALLEL POWER BRANCHES

BACKGROUND AND SUMMARY OF THE INVENTION

The present invention relates to an electrically drivable motor vehicle and a method for operating a circuit arrangement for such a motor vehicle.

Electrically drivable motor vehicles are increasingly becoming the focus of interest. The arrangement and the equipping of such electric vehicles with corresponding vehicle batteries can give rise to problems. Electrically operated motor vehicles with two vehicle batteries cooperating in case of a corresponding power requirement are known. A simple parallel connection of the two vehicle batteries is prohibited, however, as it is known that parallel connected vehicle batteries constitute an unstable system, wherein reloading of energies, according to the manufacturing tolerance of no-load voltages, can arise. Such a situation becomes even more unstable insofar as the no-load voltages move greatly with the ageing of the batteries or in case of damage to one of the vehicle batteries.

To date, this problem has been solved through the use of so-called DC/DC converters disposed between the vehicle batteries and providing a no-load voltage that can precisely cancel out the no-load difference, whereby the vehicle batteries are equally loaded in a first step even if they have differences in the no-load voltages. Such DC/DC converters can counter control in a compensating way through their counter voltage even when one of the vehicle batteries already has a lower charging state than a second vehicle battery. In this case the counter voltage of the DC/DC converter is controlled by a superordinate operating strategy so that the second vehicle battery is loaded considerably more greatly in partial load operation than the first battery. A stabilization of the whole system can also be achieved and the charge of the two vehicle batteries adapted. Such DC/DC converters are, however, comparatively expensive and require high resources.

The present invention addresses these problems of an electrically drivable motor vehicle with at least two vehicle batteries by use of an improved or at least an alternative embodiment characterized by a different structure and, associated therewith, by clearly lower costs.

This problem is solved according to the invention in that the load interrupter switches respectively comprise two power branches arranged anti-parallel to each other. A reliable charging and discharging operation of each vehicle battery can thereby be guaranteed. This is necessary in an electrically driven vehicle in order to guarantee both a reliable electrical driving operation and also the recovery of kinetic brake energy (recuperation) in a reliable manner.

Exemplary embodiments of the present invention provide an electrically drivable motor vehicle with at least two vehicle batteries that can be connected in parallel and an associated electronic circuit arrangement, whereby this circuit arrangement comprises a number of electronic load interrupter switches corresponding to the number of vehicle batteries, via which the vehicle batteries can be connected through individually or in any combination, in particular together, to an electrical consumer. The electronic circuit arrangement thus replaces the conventional use of a DC/DC converter, whereby not only a considerable cost saving is achieved but also a reduction in the weight and the 3% reduction in electrical power loss that occurs using such a DC/DC converter. In contrast, the inventive electronic circuit arrangement works virtually loss-free, whereby a degree of efficiency achievable overall is considerably higher than with comparable systems known from the prior art. With the inventive circuit arrangement it is thus possible in a simple and at the same time cost effective way to make a plurality of parallel connectable high volt batteries optimally accessible.

In one embodiment at least one load interrupter switch comprises a third power branch which is arranged parallel to the two power branches arranged anti-parallel to each other. Through the third power branch the current carrying capacity of the at least one load interrupter switch is advantageously increased.

In one embodiment of the invention the two power branches arranged anti-parallel to each other respectively comprise an IGBT and a blocking diode. The respective modules can thus be charged and discharged, whereby an undesirable and parasitic current flow between battery modules with different charging states or voltages can be effectively avoided.

In a further embodiment of the invention the third power branch comprises a field effect transistor unit which comprises at least one field effect transistor. The field effect transistor is preferably a power MOSFET or as a MOSFET. The at least one field effect transistor is preferably a low voltage MOSFET.

The use of such a field effect transistor can lead to a clear reduction in the power loss arising on the respective IGBTs. The field effect transistor unit preferably comprises a relay unit comprising at least one relay arranged in series with the at least one field effect transistor.

The field effect transistor unit preferably comprises a plurality of field effect transistors and the relay unit comprises a plurality of relays. Each relay can be electrically conductively connected via a connection to one of the vehicle batteries. Each relay can be electrically conductively connected via a further connection to at least one connection of each field effect transistor. Each field effect transistor can be electrically conductively connected via its further connection to the electrical consumer.

In a further embodiment of the invention the number of relays exceeds the number of field effect transistors. The vehicle batteries are preferably high volt batteries.

According to the invention a method is provided for operating a circuit arrangement with at least two electronic load interrupter switches for an electrically drivable motor vehicle.

In an embodiment of the inventive method at least two electronic load interrupter switches are connected through, whereby the internal resistances of at least two vehicle batteries and the electrical consumer form a star connection. In this embodiment therefore the output power of at least two batteries can be used in order to provide the power requirement necessary for a high load operation. In addition the capacitance of at least two batteries can be exhausted in order to facilitate the high load operation for a sufficient duration.

In a further embodiment the individual vehicle batteries are connected through in partial load operation via corresponding load interrupter switches alternately to the electrical consumer. The vehicle batteries are thus evenly discharged. Voltage differences between the individual vehicle batteries can thus be minimized or compensated advantageously.

The switching between partial load operation and high load operation preferably takes place in dependence upon the difference of the no-load voltages of two vehicle batteries or in dependence upon the differences of the no-load voltages of a plurality of vehicle batteries. Thus, it is possible to prevent, for example, the voltage differences between the batteries from exceeding predetermined threshold values.

In a further embodiment the IGBTs of the load interrupter switches are respectively assigned to a vehicle battery, a main battery and at least one subsidiary battery. For a period of time, the IGBTs of the load interrupter switch of the main battery are permanently connected through. The IGBTs of the load interrupter switch of the respective subsidiary battery are connected through in dependence upon requirements. It is thus provided that the power necessary for the normal driving operation is provided by the main battery. In other operating situations such as for example boost (accelerate) or recuperation operation, the power and the capacitance of at least one subsidiary battery can be additionally used.

A further embodiment provides that, for connection of the field effect transistor unit, first the relay is closed and subsequently the field effect transistor is connected, and then for disconnection of the field effect transistor unit, first the relay is opened and subsequently the field effect transistor is disconnected. An alternative embodiment provides that for the connection of the field effect transistor unit, first the relays are closed and subsequently the field effect transistors are connected, and then for disconnection of the field effect transistor unit, first the relays are opened and then the field effect transistors are disconnected. When disconnecting, therefore, an undesirable voltage drop on the field effect transistors can be avoided. The connection and/or disconnection of the field effect transistor unit is preferably performed during the secure driving operation of the motor vehicle.

In a further embodiment the field effect transistor unit is connected as a reduction means for reducing the temperature of the load interrupter switch.

Further important features and advantages of the invention follow from the drawings and the associated description of the figures by reference to the drawings.

It is understood that the abovementioned features and those to be explained below can be used not only in the indicated combination but also in other combinations or alone without going outside of the scope of the invention.

BRIEF DESCRIPTION OF THE DRAWING FIGURES

Preferred embodiments of the invention are shown in the drawings and are clarified in greater detail in the following description, whereby the same reference numerals relate to the same or similar or functionally equal components.

Figure 2:
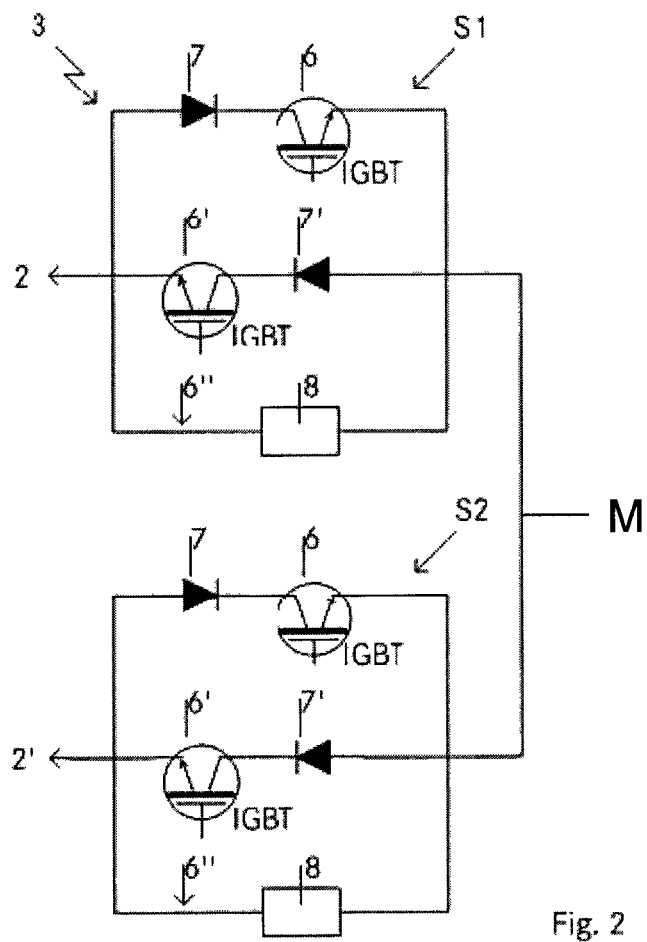
Figure 3:
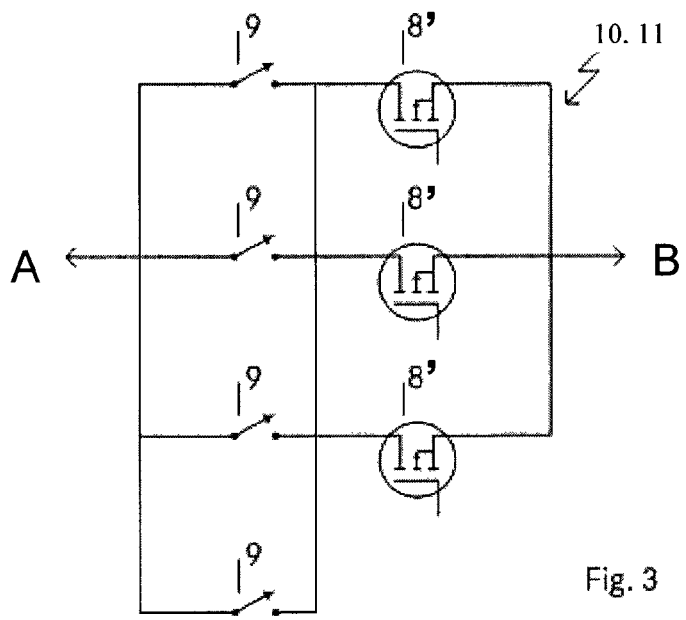
Figure 4:
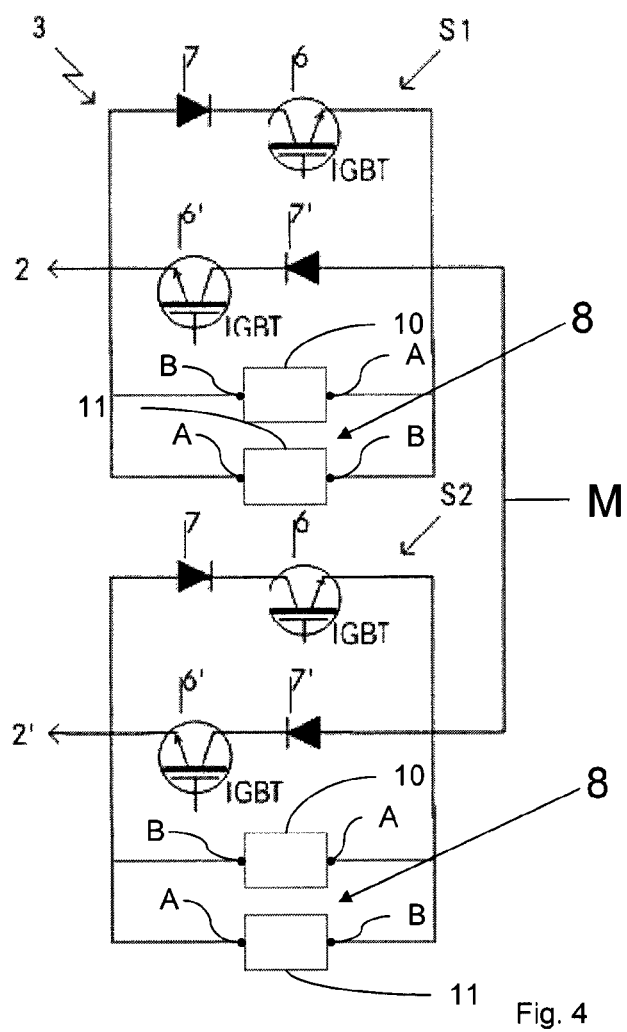

The drawings show:

FIG. 1 a circuit diagram of an inventive electrically drivable motor vehicle,

FIG. 2 a detailed representation of a circuit arrangement with individual load interrupter switches, FIG. 3 a detailed representation of a field effect transistor unit for reducing an electrical power loss, and FIG. 4 a further detailed representation of a circuit arrangement with individual load interrupter switches.

DETAILED DESCRIPTION

Referring now to FIG. 1, an electric system 1 for driving an electric vehicle comprises at least two parallel connectable vehicle batteries 2 and 2' and an electronic circuit arrangement 3 which comprises a number of electronic load interrupter switches S1, S2 corresponding to the number of vehicle batteries 2, 2', via which the vehicle batteries 2, 2' can be connected through individually or together to an electrical consumer, for example an electric drive motor. R1 and R2 designate the internal resistances of the vehicle batteries 2, 2', whereas a switch S symbolizes an end stage 5 and an electric motor M with the reference numeral 4 a variable load of the drive which results, for example, through the cycling of the switch S.

In partial load operation only one of the two vehicle batteries 2, 2' is always used via the corresponding load interrupter switch S1, S2, and is used in such a way that the charges of the individual vehicle batteries 2, 2' preferably evenly diminish. Of course, more than the two vehicle batteries 2, 2' shown in FIG. 1 can be employed with the present invention. In high load operation of the electrically drivable vehicle, which is generally only used in the short term, the two load interrupter switches S1 and S2 are connected together, whereby a star connection follows from the resistances R1 and R2 and also M. In case of new vehicle batteries 2, 2' the voltage conditions are such that already at 10% to 20% of the maximum power output of a vehicle battery 2, 2' no current can flow back into the other vehicle battery 2', 2. In case of damaged vehicle batteries 2, 2' these values are obviously higher, whereby the electrical system 1 remains in any case without current backflow into the respectively functioning vehicle battery 2, 2'. If, however, one of the vehicle batteries 2, 2' is loaded with 80% and a no-load voltage of the at least one further vehicle battery 2' 2 is thereby not yet fallen short of, this further vehicle battery 2', 2 is either completely discharged flat or damaged in such a way that it must be exchanged. A switching point from the partial load to the high load region is fixed according to the invention through a corresponding operating strategy in consideration of a currently recognizable no-load difference of the two vehicle batteries 2, 2'. In general, reference is made here and below always to two vehicle batteries 2, 2', whereby it is obviously clear that clearly more can also be provided, for example, three or four can be provided.

With the electric system 1, i.e., in particular with the electric circuit arrangement 3, a voltage converter (DC/DC converter) provided to date instead of the electric circuit arrangement 3 can be saved and in spite of this the energy contents of a plurality of parallel connectable high volt vehicle batteries 2, 2' can be optimally made accessible. According to FIG. 1 the end stage 5 is thereby shown in the region of the switch S, whereby this end stage 5 can possibly be omitted.

According to FIG. 2, the inventive circuit arrangement 3 is shown with two load interrupter switches S1 and S2, which are respectively constructed from two power branches 6 and 6' lying anti-parallel with respectively integrated IGBTs (insulated gate bipolar transistor) and an associated blocking diode 7, 7'.

Thus, a first vehicle battery 2 is electrically conductively connectable to a first anode of a first blocking diode 7. A first cathode of the first blocking diode 7 is connected to a first collector of the first IGBT 6. A first emitter of the first IGBT 6 is electrically conductively connectable to the electrical consumer M, 4.

Furthermore the electrical consumer M, 4 is electrically conductively connectable to a second anode of a second blocking diode 7'. A second cathode of the second blocking diode 7' is connected to a second collector of the second IGBT 6'. A second emitter of the second IGBT 6' is electrically conductively connectable to the first vehicle battery 2.

A second vehicle battery 2' is electrically conductively connectable to a third anode of a third blocking diode 7, whereby a third cathode of the third blocking diode 7 is connected to a third collector of the third IGBT 6. A third emitter of the third IGBT 6 is thereby electrically conductively connectable to the electrical consumer M, 4.

Additionally, the electrical consumer M, 4 is electrically conductively connectable to a fourth anode of a fourth blocking diode 7'. A fourth cathode of the fourth blocking diode 7' is connected to a fourth collector of the fourth IGBT 6'. The fourth emitter of the fourth IGBT 6' is electrically conductively connectable to the second vehicle battery 2'.

A field effect transistor unit 8 advantageously lies in a further, third parallel power branch 6". The IGBTs arranged anti-parallel in the two power branches 6 and 6' facilitate a power removal and simultaneously a recuperation, i.e., a charging, of the vehicle batteries 2, 2'. The likewise anti-parallel blocking diodes 7, 7' prevent parasitic currents from a vehicle battery 2 to the other vehicle battery 2'. If one of the two power branches 6, 6' is connected through, typically a voltage of approximately 5V still lies at the respective IGBT. The associated power loss can be further reduced by connecting the field effect transistor unit 8, whereby a field effect transistor unit 10, 11 is set out in detail, for example, according to FIG. 3. An individual power MOSFET 8' usually still has a resistance of approximately 2 mOhm.

Through a parallel connection of a plurality of MOSFETs 8', as shown for example according to FIG. 3, the circuit resistance can be further reduced. It can likewise be derived from FIG. 3 that relays 9 lie in series with the individual Power MOSFETs' 8', whereby on the one hand a load-free connection of the relays 9 and on the other hand a use of low Ohm, low voltage MOSFETs is facilitated.

In the detailed illustration shown according to FIG. 3 of a field effect transistor unit 10, 11 the relays 9 are electrically conductively connectable on the input side to a first nodal point A. The MOSFETs 8' respectively comprise a first connection formed as a drain connection. Furthermore, the MOSFETs 8' respectively comprise a second connection configured as a source connection. Furthermore the MOSFETs 8' respectively comprise a third connection configured as a gate connection. The relays 9 are connected on the output side to the first connections of the MOSFETs 8'. The second connections of the MOSFETs 8' are electrically conductively connectable to a second nodal point B.

FIG. 4 shows a detailed representation of the circuit arrangement shown in FIG. 2 with individual load interrupter switches S1, S2. The circuit arrangement shown in FIG. 4 shows a detailed representation of the field effect transistor unit 8 already shown in FIG. 2 for each load interrupter switch S1, S2.

For each load interrupter switch S1, S2, each field effect transistor unit 8 comprises a plurality of, in particular two, field effect transistor units 10, 11 respectively configured according to the type shown in FIG. 3.

The first field effect transistor unit 10 is electrically conductively connectable via the second nodal point B to one of the vehicle batteries 2, 2'. Furthermore the first field effect transistor unit 10 is electrically conductively connectable via the first nodal point A with the electrical consumer M, 4. The first field effect transistor unit 10 can thus be connected parallel to the current path—shown from the blocking diode 7 and the IGBT arranged in the power branch—for a driving operation. The power loss of the circuit arrangement 3 can be minimized during the driving operation with the first field effect transistor unit 10.

The second field effect transistor unit 11 is electrically conductively connectable via the second nodal point B to the electrical consumer M, 4. Furthermore the second field effect transistor unit 11 is electrically conductively connectable via the first nodal point A with one of the vehicle batteries 2, 2'. The second field effect transistor unit 11 can thus be connected parallel to the current path for a recuperation operation—shown from the blocking diode 7' and the IGBT arranged in the power branch 6'. With this second field effect transistor unit 11 the power loss of the circuit arrangement 3 can be minimized during the recuperation operation.

The circuit arrangement 3 shown according to FIG. 2 provides an electronic switch for large currents (typically 100 Ampere), which can be blocked in both directions. This means that an opened load interrupter switch S1, S2 must be blocked both when the voltage at the point "vehicle battery 2" is greater than at point "M" and when the voltage on the vehicle battery 2 is smaller than at point "M". Normal electronic switches are not able to do this. By means of the blocking diodes 7, 7' undesirable electric currents can be blocked, whereby, for example, the blocking diode 7 and the IGBT arranged in the power branch 6 constitute the current path for a driving operation, while the blocking diode 7' and the IGBT arranged in the power branch 6' represent a current path for a recuperation operation of the load interrupter switch S1. In such an arrangement there are all in all no further parasitic diodes for the load interrupter switch S1, as the comparable blocking diodes 7, 7' in the load interrupter switch S2 and the associated IGBTs form the load interrupter switch S2.

An inventive operating method involves that, for a fairly long period (e.g., for 20 minutes), driving takes place only with the aid of a single vehicle battery 2, 2' (current main battery) and the other vehicle battery 2, 2' is only used in the short term for boosting or for heavy braking (current subsidiary battery). With respect to the main battery, both assigned IGBTs are permanently connected through corresponding to an operating strategy, while the IGBTs of the respective subsidiary battery are only connected as required. An electric power loss of the circuit arrangement 3 illustrated according to FIG. 2 amounts to approximately 100 Ampere, in total therefore approximately 700 Watt. This is due to the fact that the voltage reduction in the circuit arrangement 3 amounts to approximately 3.5 V and the current in total 200 Ampere. By using both field effect transistor units 8 the power loss thereby reduces to below 100 Watt.

According to FIG. 3 a field effect transistor unit 10, 11 comprising Power MOSFETs 8' and associated relays 9 is connected whereby usually parallel connected power MOSFETs 8' are used for low voltages (40 V) with internal resistances of typically 2 mOhm and parallel connected relays 9. According to FIG. 3 the number of relays 9 arranged parallel to each other can exceed the number of MOSFETs 8' arranged parallel to each other. In order to connect the field effect transistor unit represented according to FIG. 3, the electrically drivable motor vehicle must be stable in driving operation and the individual Power MOSFETs 8 must respectively be open. In this state, initially the individual relays 9 are connected load-free and this is maintained for a period of time (e.g., 100 msec) until all running time differences of the individual relays 9 have become insignificant. Load-free relays 9 can thereby be connected extremely frequently and practically without wear. In addition parallel connected relays 9 behave accommodatingly in relation to manufacturing tolerances if they have been connected without wear.

In a second step, the power MOSFETs 8' (field effect transistors) are then connected. As these power MOSFETs 8' form ohmic resistances in zero crossing they also behave accommodatingly in relation to manufacturing tolerances. If the power MOSFETs 8' are first connected they can also conduct, as ohmic resistors, recuperation currents at the same level and with the same degree of efficiency. The power MOSFETs 8' (field effect transistors) can, however, not be opened in recuperation operation, but instead the opening must wait for a driving operation The opening of the power MOSFETs 8' and the relays 9 takes place upon opening in the reverse sequence to that used for closure. Through this method of separation of the voltage through relays 9 the power MOSFETs 8' can be used for lower voltages (e.g. 40 V). Indeed, it is only at these voltages that there are already construction types today with low internal resistances of for example 2 milliohms.

Also conceivable is an extended operating strategy in case of full load and misuse. In case of an aggressive driving mode, the IGBTs of the respective subsidiary battery could heat up the associated load interrupter switch S1, whereby the operating strategy involves the power MOSFETs 8' of the subsidiary battery also being connected with regard to the driving situation. This leads to an immediate, clear reduction in the power loss, whereupon the temperature of the circuit arrangement 3 falls again. For certain periods, increased switching cycles of the relays 9 must be taken into consideration in this emergency case, but the circuit arrangement 9 with this strategy reliably controls the driving situation and the increased relay switching cycles merely constitute a slight noise problem.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An electrically drivable motor vehicle, comprising:
at least two parallel connectable vehicle batteries; and
an electronic circuit arrangement comprising a number of electronic load interrupter switches corresponding to the at least two parallel connectable vehicle batteries, wherein the at least two parallel connectable vehicle batteries can be connected individually or jointly to an electrical consumer via the electronic circuit arrangement, wherein the load interrupter switches respectively comprise two power branches arranged anti-parallel to each other,
wherein at least one of the load interrupter switches comprises a third power branch arranged parallel to the two power branches arranged anti-parallel to each other,
wherein the two power branches arranged anti-parallel to each other respectively comprise an IGBT and a blocking diode, and the third power branch comprises a field effect transistor unit comprising at least one field effect transistor and a relay unit comprising at least one relay arranged in series with the at least one field effect transistor.

2. The electrically drivable motor vehicle according to claim 1, wherein the field effect transistor unit comprises a plurality of field effect transistors and the relay unit comprises a plurality of relays, wherein each relay is electrically conductively connectable via a connection to one of the at least two parallel connectable vehicle batteries, and each relay is electrically conductively connectable via a further connection to a connection of each field effect transistor, and wherein each field effect transistor is electrically conductively connectable via its further connection to the electrical consumer.

3. A method for operating a circuit arrangement with at least two electronic load interrupter switches for an electrically drivable motor vehicle, comprising:
connecting at least two electronic load interrupter switches to an electrical consumer in high load operation, wherein internal resistances of at least two vehicle batteries and the electrical consumer form a star connection,
wherein the at least two load interrupter switches include IGBTs that are respectively assigned to the at least two vehicle batteries, wherein a first one of the at least two vehicle batteries is a main battery and a second one of the at least two vehicle batteries is a subsidiary battery, and
wherein for a period of time, the IGBTs of the load interrupter switch of the main battery are permanently connected through to the electrical consumer and the IGBTs of the load interrupter switch of the subsidiary battery are connected through to the electrical consumer in dependence upon requirements.

4. The method for operating a circuit arrangement according to claim 3, further comprising:
alternately connecting, in partial load operation, the individual vehicle batteries to the electrical consumer via corresponding load interrupter switches so that the at least two vehicle batteries are discharged evenly.

5. The method for operating a circuit arrangement according to claim 4, further comprising:
controlling a changeover between partial load operation and high load operation in dependence upon a difference in no-load voltages of the at least two vehicle batteries.

6. A method for operating a circuit arrangement with at least two electronic load interrupter switches for an electrically drivable motor vehicle, comprising:
connecting at least two electronic load interrupter switches to an electrical consumer in high load operation, wherein internal resistances of at least two vehicle batteries and the electrical consumer form a star connection, wherein the circuit arrangement includes a field effect transistor unit,
wherein for connection of the field effect transistor unit,
first relays of the field effect transistor unit are closed, and
subsequently a field effect transistor of the field effect transistor unit is connected, and
wherein for disconnection of the field effect transistor unit,
first the relays of the field effect transistor unit are opened, and
subsequently the field effect transistor of the field effect transistor unit is disconnected,
wherein the connection or disconnection of the field effect transistor unit is performed during a driving operation of the motor vehicle.

7. The method for operating a circuit arrangement according to claim 6, wherein the field effect transistor unit is connected as a reduction means for reducing the temperature of the load interrupter switch.

8. The method for operating a circuit arrangement according to claim 6, further comprising:
alternately connecting, in partial load operation, the individual vehicle batteries to the electrical consumer via corresponding load interrupter switches so that the at least two vehicle batteries are discharged evenly.

9. The method for operating a circuit arrangement according to claim 8, further comprising:
controlling a changeover between partial load operation and high load operation in dependence upon a difference in no-load voltages of the at least two vehicle batteries.

* * * * *